Oct. 31, 1967  C. E. ZWEIDINGER  3,349,668
FILM SLIDE PROJECTOR

Filed March 16, 1965  8 Sheets-Sheet 1

INVENTOR
Carl E. Zweidinger
BY
ATTORNEYS

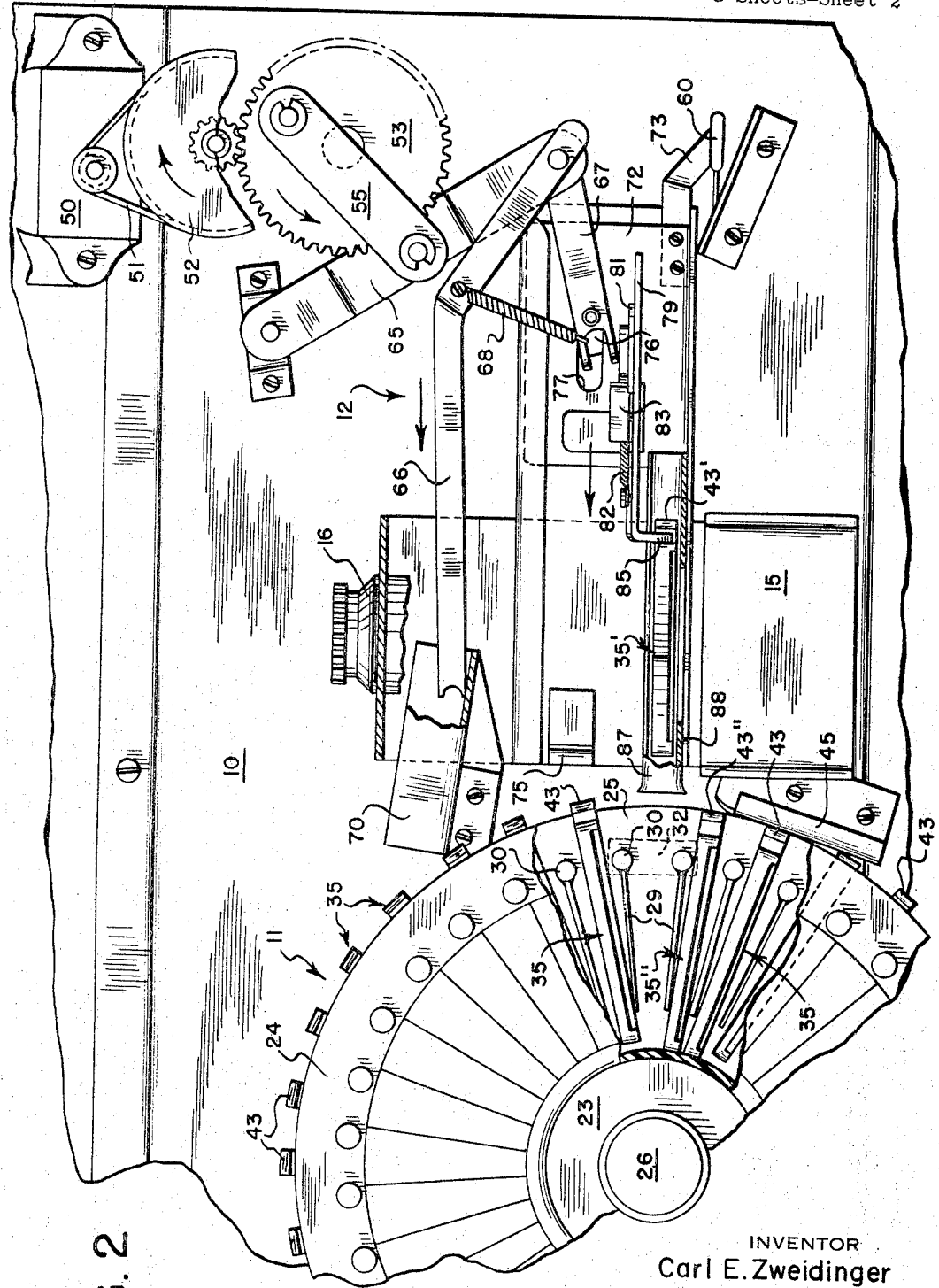

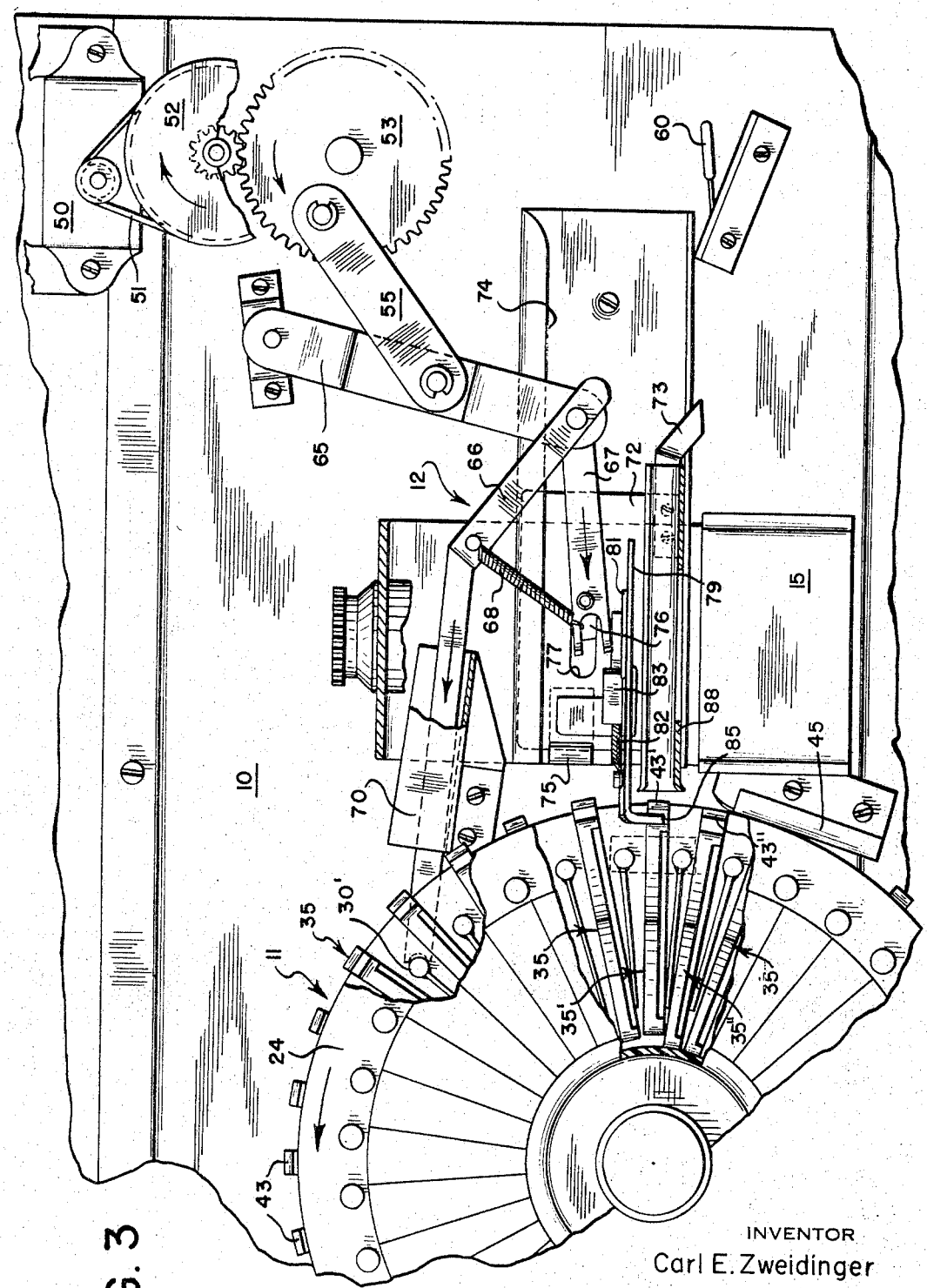

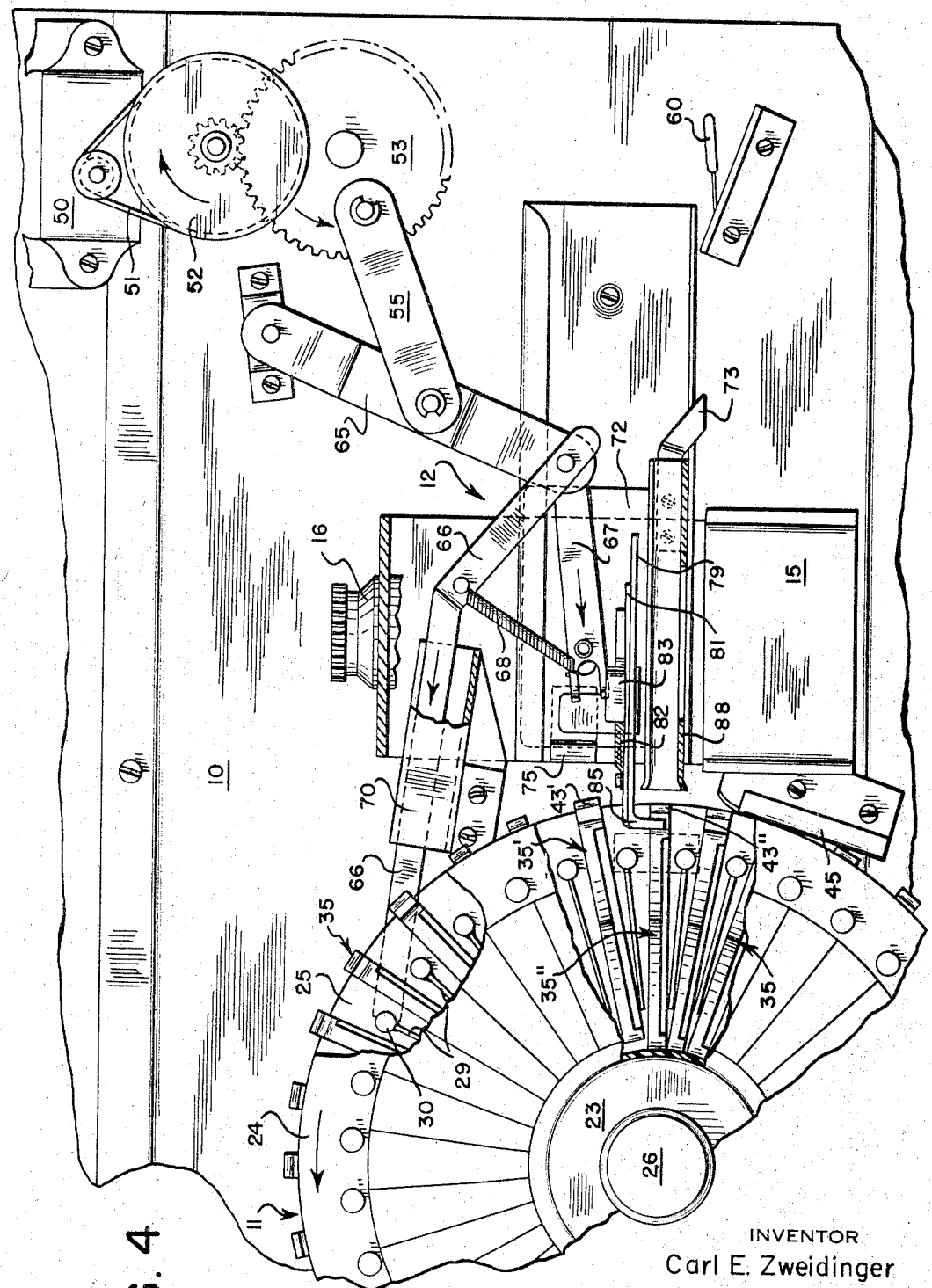

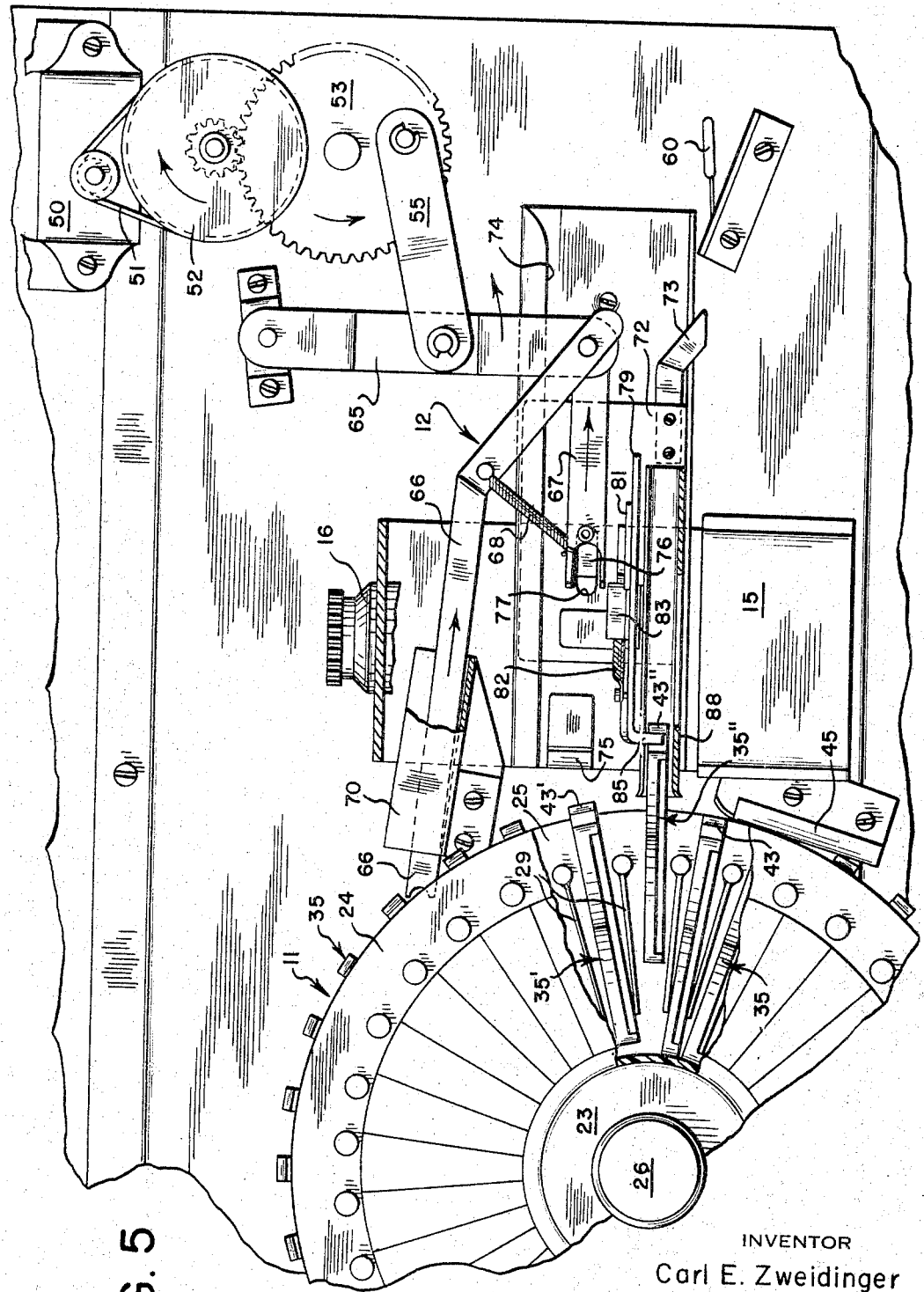

Oct. 31, 1967

C. E. ZWEIDINGER 3,349,668

FILM SLIDE PROJECTOR

Filed March 16, 1965

INVENTOR
Carl E. Zweidinger
BY
ATTORNEYS

INVENTOR
Carl E. Zweidinger

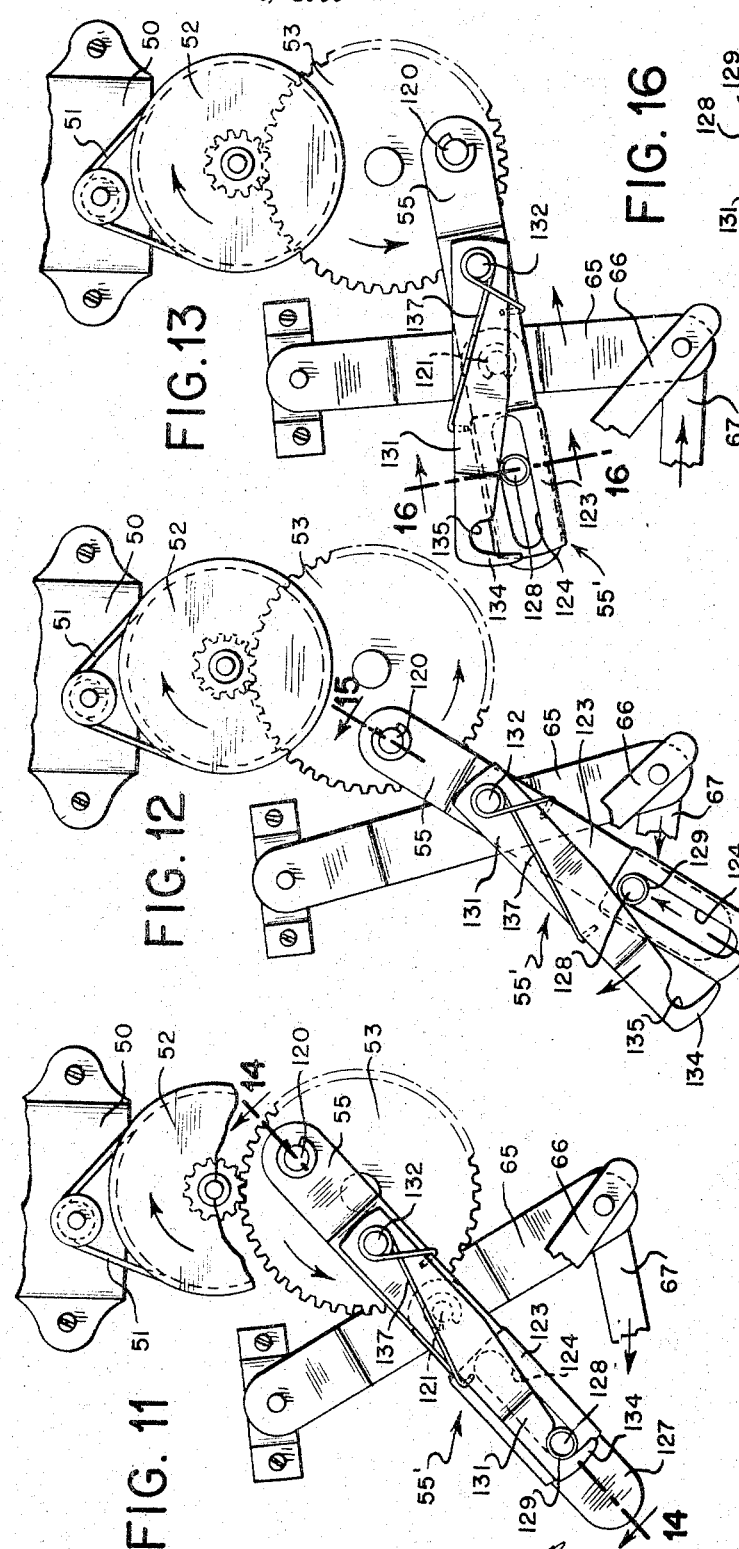
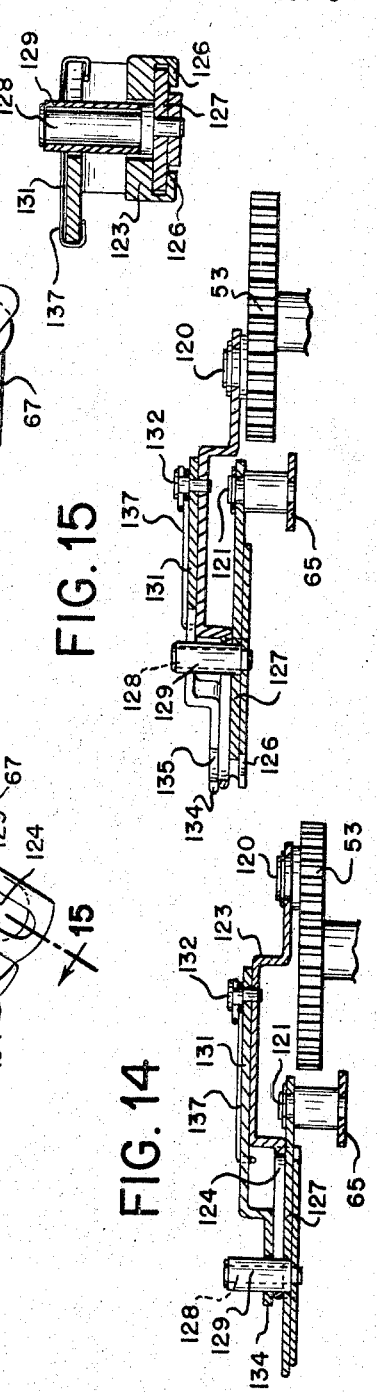

United States Patent Office 3,349,668
Patented Oct. 31, 1967

3,349,668
FILM SLIDE PROJECTOR
Carl E. Zweidinger, Richmond Hill, N.Y., assignor to Camera Optics Manufacturing Corp., Long Island City, N.Y., a corporation of New York
Filed Mar. 16, 1965, Ser. No. 440,224
13 Claims. (Cl. 88—27)

This invention relates to film slide projectors and particularly to improvements in the slide-changing mechanism of a slide projector having a magazine of the rotatable drum type.

Slide projectors are widely used devices for projecting images on slide transparencies upon opaque or transparent surfaces for viewing, display and other purposes. A rotary drum magazine slide projector uses a rotatable cylindrical magazine to store a plurality of slide transparencies in slots or spaces within the magazine. The slides thus stored are removed one at a time from the magazine and placed within an optical projection system for projection upon a screen. This invention provides an improved slide-changing mechanism of great simplicity, economy and ease of maintenance. A sliding carriage is used to transfer slide transparencies back and forth between the rotary drum slide magazine and the optical projection system. Extremely simple and efficient mechanical means are provided to control the reciprocal movement of the carriage in its slide-changing cycle halting its travel for a portion of the cycle after a slide transparency has been returned to its location in the magazine and while the drum magazine is indexed or rotated to its next position.

The invention is applicable to a film slide projector wherein slide holders are stored in respective slots in a rotatable magazine. Broadly stated, the slide-changing mechanism provides for displacing successive holders between the magazine and optical projecting means and it comprises a frame and a carriage on the frame reciprocable in a path extending past the projecting means toward the magazine. Reciprocable indexing means are included on the frame for rotating the magazine to index the successive slots into alignment with the carriage path after the carriage approaches nearest the magazine. Coupling means are provided on the carriage from which one holder is detached and another attached as the magazine is indexed and which is disposed to locate an attached holder operatively within the projecting means when the carriage is remote from the magazine. Drive means are included for reciprocating the carriage and indexing means.

Another feature of the invention is that each slide holder circumscribes its respective slide and has one edge defined by oppositely biased spring strips. One of the strips is adapted to bear resiliently against the slide and the other against the magazine, so that the slide is held releasably in the holder and the holder is held releasably in the magazine.

A preferred embodiment of the invention is described hereinbelow with reference to the accompanying drawings, wherein FIG. 1 is a plan view partly broken away of the film slide projecting device;

FIG. 2 is an enlarged fragmentary plan view partly broken away showing the slide-changing mechanism in a first stage of its cycle of operation;

FIG. 3 is an enlarged fragmentary plan view partly broken away showing the slide-changing mechanism in a second stage of its cycle of operation;

FIG. 4 is an enlarged fragmentary plan view partly broken away showing the slide-changing mechanism in a third stage of its cycle of operation;

FIG. 5 is an enlarged fragmentary plan view partly broken away showing the slide-changing mechanism in a fourth stage of its cycle of operation;

FIG. 11 is an enlarged fragmentary plan view of overload control means for the slide-changing mechanism under normal conditions;

FIG. 12 is a view similar to FIG. 11 of the overload control means under overload conditions;

FIG. 13 is a view similar to FIGS. 11 and 12 of the overload control means returning to normal condition;

FIG. 14 is a section taken along the line 14—14 of FIG. 11;

FIG. 15 is a section taken along the line 15—15 of FIG. 12; and

FIG. 16 is a section taken along the line 16—16 of FIG. 13.

Figure 1:
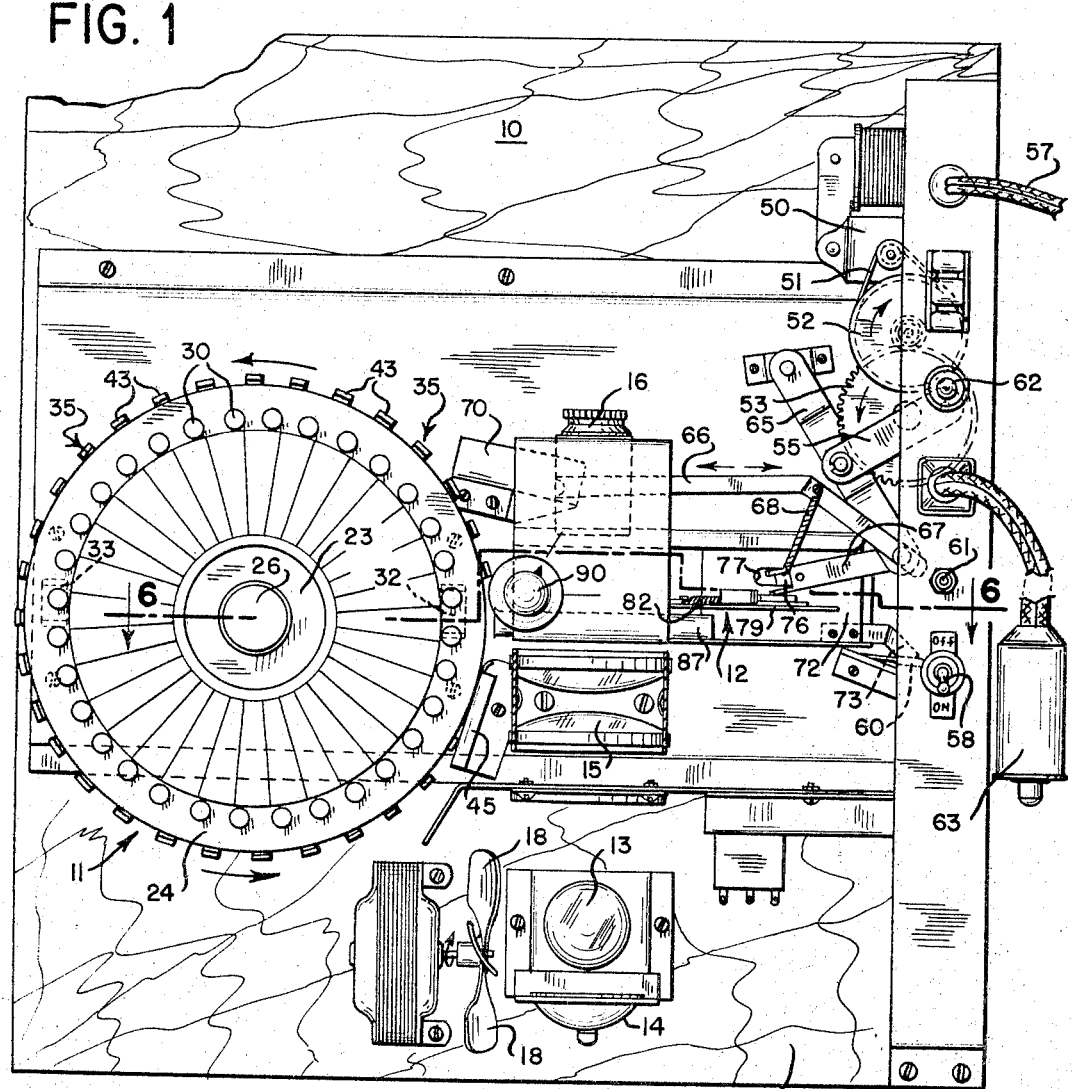

Referring first to FIG. 1, the film slide projecting device of the invention includes a frame 10 upon which is rotatably mounted a drum-type magazine 11 which is described in detail hereinafter. In a manner which is also discussed in detail hereinafter, a collection of slides stored vertically in the magazine 11 are successively removed horizontally therefrom by a slide-changing mechanism 12 and operatively located within light-projecting means. The light-projecting means includes an incandescent bulb 13 and a reflector 14 located to direct the light from the source 13 into a condensing lens unit 15. From the condensing lens unit 15, the light passes through the slide and thence through an adjustable focusing lens unit 16 to be projected onto a screen. The screen, which is not shown in the drawings, may be of the usual opaque kind mounted at some distance from the projecting device or it may be of the so-called rear-screen type which is a transparent screen adapted to be folded out of a case in which the film slide projecting device is carried. A motor driven fan 18 is mounted alongside the light bulb 13 to maintain the proper temperature level of the bulb during operation.

The drum-type magazine 11 may be described with reference to each of FIGS. 1 to 7. It comprises a fixed central vertical shaft 20 secured to the frame 10 by a nut 21. A hub assembly of the magazine 11 includes a central journal 22 rotatably disposed about the shaft 20, an annular web portion 23 projecting outwardly from the journal 22, and spaced cylindrical flanges 24 and 25 extending radially outwardly from the web 23 to define the periphery of the magazine 11. The magazine 11 is held in place on the shaft 20 by a removable nut 26 threaded onto the end of the shaft 20 remote from the frame 10.

Projecting from the lower side of the upper flange 24 is an array of spaced radial guide plates 28 defining a plurality of radial slots, which in this example are thirty six in number. A similar array of guide plates 29 project upwardly from the upper side of the lower flange 25, and the grooves which they define are in registry with those defined with the upper guide plates 28. Projecting from the lower side of the lower flange 25 about the periphery thereof is a circular array of posts 30 which correspond in number to the lower guide plates 29. A pair of detent springs 32 and 33 attached to the frame 10 engage the posts 30 so that the magazine 11 is constrained to occupy one of thirty six discrete positions and yet is rotatably displaceable from one such position to the next over the detent springs.

Figure 8:
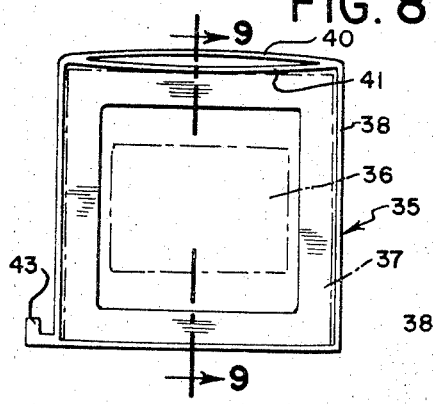
FIG. 8 is an enlarged elevation of a slide-holder specially adapted to the projecting device.
Figure 9:
FIG. 9 is a section taken along the line 9—9 of FIG. 8.

Located within and conforming generally in shape to the various slots defined by the guide plates 28 and 29 are a corresponding number of slide holders 35 shown in detail in FIGS. 8 and 9. The slides contained in these holders are of the conventional type including a transparency 36 and a frame 37. Each slide holder consists of a rectangular flanged element 38 in which the frame 37 of the slide is seated. The upper edge of the flanged element 38, however, is formed of oppositely biased spring strips 40 and 41. The inner spring strip 41 is adapted to bear against the frame 37 of the slide to hold the slide in place, while the outer spring strip 41 is adapted to bear against the underside of the upper flange 24 to maintain the slide holder in its proper location within the magazine 11. The restraining action of both of the spring strips 40 and 41 is of a releasable nature which can easily be overcome when the slide is to be removed from the holder or when the holder is to be removed from the magazine. At one lower corner of the holder is an upwardly directed hook 43 extending integrally from that lower corner of the framing element 38 remote from the magazine axis, for use in withdrawing and returning the holder relative to the magazine as will be described hereinafter. Mounted on the frame 10 adjacent the magazine 11 is a rigid wiping element 45 which urges the successive holders 35 inwardly into their slots as the magazine 11 rotates.

Driving means for the magazine 11 and the slide-changing mechanism 12 are provided which is illustrated most clearly in FIGS. 1 to 5. It includes an electric motor 50 mounted on the base 10 and adapted by means of a belt 51 to turn a pulley 52 in the clockwise direction shown by the arrows in FIGS. 1 to 5. This pulley 52 in turn transmits opposite rotation at a reduced rate to a gear 53 rotatably mounted on the frame 10. The actuating force for both the magazine 11 and the slide-changing mechanism 12 is transmitted thereto by means of a crank 55 pivotally mounted adjacent the periphery of the gear 53.

Electrical control means are included for intermittently operating the motor 50. In the form shown, a cable 57 provides the primary power source which may be turned on or off by a switch 58. Each time a slide is changed, a micro switch 60 is closed to de-energize the motor 50 and stop the mechanism. By means of a time delay circuit adjustable by a knob attached to a shaft 61, the motor 50 is re-energized to actuate the slide-changing mechanism once again. Alternatively, the time delay circuit may be disconnected to permit the motor 50 to be de-energized on demand by a button switch 62 or by a remote control switch 63 to operate the slide-changing mechanism once again. The circuitry and function of these electrical systems are described hereinafter with reference to FIG. 10.

Figure 6:
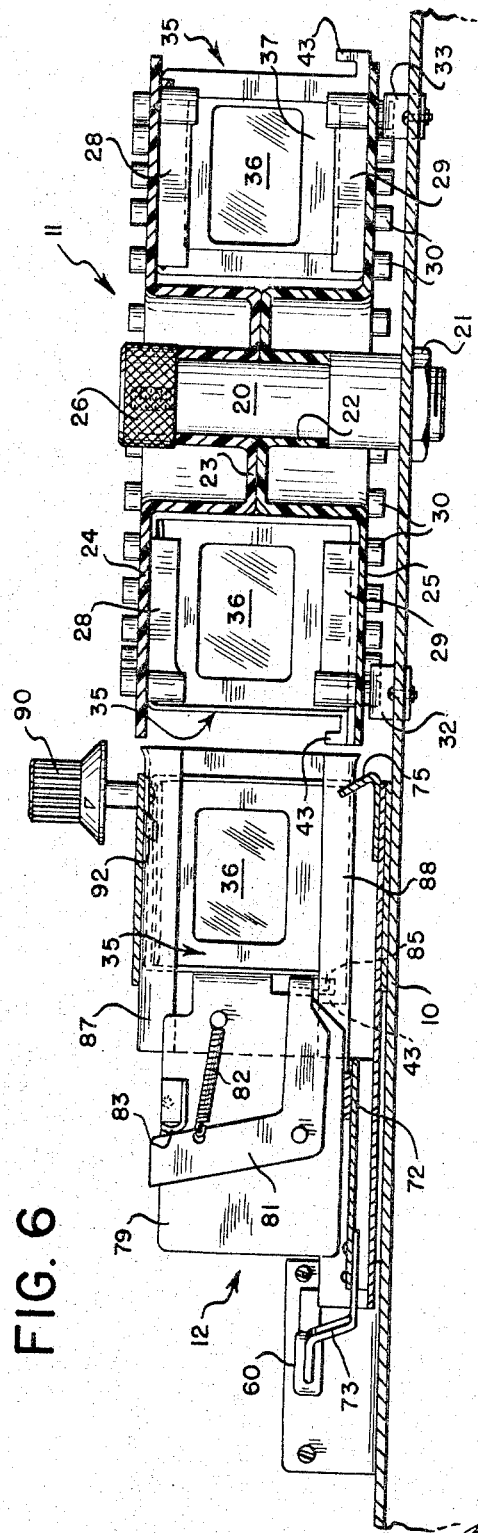
FIG. 6 is an enlarged sectional elevation taken along the line 6—6 of FIG. 1.
Figure 7:
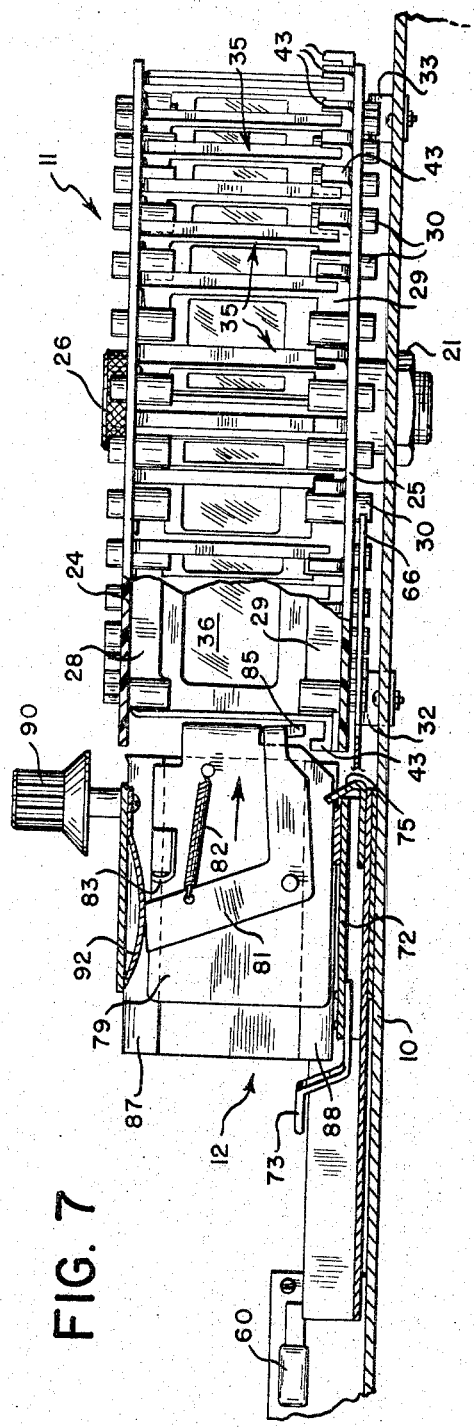
FIG. 7 is an enlarged sectional elevation similar to FIG. 6 showing the slide-changing mechanism in the third stage of its cycle of operation otherwise shown in FIG. 4.

The elements for the slide-changing mechanism 12 and the means for indexing the magazine 11 can best be described by reference to any one of FIGS. 2 to 5 and either of FIGS. 6 or 7. The crank 55 is pivotally connected intermediate the ends of a rocker arm 65 which in turn is pivotally mounted to the frame 10. The outer end of the rocker arm 65 is pivotally connected to an extended indexing arm 66 and to a shorter pusher arm 67, the latter two being interconnected and urged together in scissors fashion by a tension spring 68. The outer end of the indexing arm 66 is directed downwardly closer to the frame 10 and through a guide channel 70 so that its outer end is engageable with the successive posts 30 extending from the lower flange 25 of the magazine. As the crank 55 reciprocates the rocker arm 65, the indexing arm 66 reciprocates toward and away from the periphery of the magazine 11 generally tangential to the array of posts 30, and at the end of each forward reciprocation of the indexing arm 66 it engages one of the posts 30 and indexes the magazine 11 through one of the discrete positions thereof determined by the detent springs 32 and 33.

The pusher arm 67, which is also reciprocated by the rocker arm 65, moves a carriage 72 back and forth in a horizontal track 74 fixed to the base 10. In the extreme rearward position of the carriage 72, an arm 73 projecting therefrom engages the micro switch 60 to de-energize the motor 50 as shown in FIGS. 1 and 2. A stop 75 which is fixed relative to the base 10 limits the extreme forward motion of the carriage 72. However, the carriage 72 and pusher arm 67 are linked by a lost-motion slide assembly 76 and groove 77 which permit the pusher arm 67 to move forwardly a small amount after the carriage 72 has been halted by the stop 75. Projecting upwardly from one side of the carriage 72 is a vertical plate 79 (see FIGS. 6 and 7) disposed radially with respect to the magazine 11. A curved arm 81 is pivotally attached to the vertical plate 79 with one end thereof under the bias of a tension spring 82 against a stop 83. The other end of the arm 81 projects forwardly of the vertical plate 79 and has a downwardly directed hook-like coupled 85 at its extremity nearest the magazine adapted to engage and mate with the hooks 43 on the respective holders 35. The arm 81 is normally in the position shown in FIG. 6 with its coupler 85 in position to engage one of the slides. When it does so, it is adapted to displace the respective slides in vertical tracks 87 and 88 which are rigidly fixed relative to the frame 10. By means of a knob 90 at the top of the apparatus, a resilient curved cam 92 in the form of a leaf spring can be swung from the position shown in FIG. 6 to that shown in FIG. 7, whereby the end of the arm 81 remote from the coupler 85 is engaged in the forward position of the vertical plate 79 and the arm 81 is rotated to lift the coupler 85 out of operative engagement with the respective hooks 43 on the holders 35.

The operation of this device can best be understood by considering four positions in its functional cycle. The first of these positions is shown in FIG. 2. Slide holder 35' is withdrawn from its slot defined by upper and lower guiding plates on the magazine 11 (lower guiding plates 29' are visible in FIG. 2) and is in projecting position between the lens assemblies 15 and 16. The hook 43' of the slideholder 35' is engaged with the coupler 85 on the vertical plate 79 and the carriage 72 is at its farthest point of travel away from the magazine. To initiate a slide-changing cycle in which the slideholder 35' is exchanged from the next slideholder 35'' in the magazine, the motor 50 is energized. Upon energization the motor 50 causes the rotation of the associated pulleys 52 and turns the gear 53 in a counterclockwise direction as shown by the arrow in FIG. 2. As the gear 53 rotates, the attached crank 55 causes the rocker arm 65 to swing about its pivot in a clockwise direction, moving the indexing arm 66 and the pusher arm 67 toward the magazine 11. The free end of the indexing arm 66 is directed in its motion toward one of the posts 30 on the lower periphery of the magazine 11 by means of the guide channel 70. The spring 68 which connects the indexing arm 66 with the pusher arm 67 causes the end of the pusher arm 67 in the slot 77 to be held firmly against the side of the slot and prevents sliding movement of the pusher arm 67 in the slot 77 at this time. Thus as the pusher arm 67 moves toward the magazine so does the carriage 72 and the vertical plate 79, pushing the slideholder 35' back toward its slot in the magazine.

Continued rotation of the gear 53 produces the situation shown in FIG. 3 wherein the slide holder 35' has been pushed completely into its slot in the magazine, the carriage 72 has come up against the stop 75 in its movement toward the magazine, and the outer end of the indexing arm 66 is contacting the post 30' toward which it was directed. Further rotation of the gear 53 causes the rocker arm 65 to swing still closer toward the magazine, moving the indexing arm 66 and the pusher arm 67 with it. The indexing arm 66 continues to bear against the post 30' and causes counterclockwise rotation of the magazine 11 over its spring detents 32 and 33 to the next of its thirty-six discrete positions which is shown in FIG. 4.

As the magazine 11 rotates, the hook 43' of the slide holder 35' swings out of engagement with the coupler 85 on the vertical plate 79 and the hook 43" on the next slide holder 35" swings into engagement with the coupler 85. Since the forward movement of the carriage 72 is prevented by the stop 75, this continued swing of the rocker arm 65 causes the pusher arm 67 to slide in the slot 77 despite the tension exerted by the spring 67.

As the movement of the mechanism continues in its cycle from the position shown in FIG. 4 to that shown in FIG. 5, the gear 53 causes the rocker arm 65 to reverse its swing and pull the indexing arm 66 and pusher arm 67 away from the magazine. As the pusher arm 67 begins to retract, it first slides back in the slot 77 and thereafter carries the carriage 72 and the newly coupled slide holder 35" to the right as shown in FIG. 5. When the gear 53 has completed one revolution the cycle is completed and the mechanism assumes a state identical to that shown in FIG. 2 except that the slide holder 35" has been exchanged for the slide holder 35'.

When the slide holder 35' is fully withdrawn from the magazine, the arm 73 on the carriage 72 actuates the switch 60, giving an indication that one complete slide-changing cycle has been performed. After the desired number of slides in a given magazine have been shown, the knob 90 is turned from the position shown in FIG. 6 so that the spring cam 92 engages the arm 81 in the next forward stroke of the carriage 72, as shown in FIG. 7. This raises the coupler 85 out of operating position and the next slide holder in the magazine is left in place when the carriage returns to its FIG. 2 position. The nut 26 is then removed and the magazine 11 is taken off the shaft 20. Because of the resilient force applied by the upper spring strips 41 of the respective slide holders 35 to the underside of the upper flange 24 of the magazine, the various slide holders 35 will stay in place within the magazine. To change one or more slide holders in a given magazine, however, they may be pulled out of their slots very easily against the resilient force of their upper spring strips 41. Even then, the slides 36, 37 in one of the removed slide holders 35 will not inadvertently fall out of place because it is held in position by the resilient force of the lower spring strip 40 of its associated slide holder, though this force may readily be overcome if it is desired to replace the slide in the holder with a different one.

The switch 60 is electrically connected to circuitry to permit several modes of operation of the slide projector. In all the modes of operation, the motor 50 is de-energized when switch 60 is actuated by the arm 73. In the first mode of operation, the push-button 62 is depressed to override the switch 60 and energize the motor 50 until one complete cycle of operation is completed and actuation of the switch 60 again de-energizes the motor 25. The second mode of operation utilizes the remote control push-button 63 connected to the projector by means of an electrical cable. The remote push-button 63 is connected in parallel with the bush-button 62 and operates in the same manner and to the same effect. The third mode of operation permits the automatic repetition of a slide-changing cycle at predetermined and adjustable time intervals.

Figure 10:
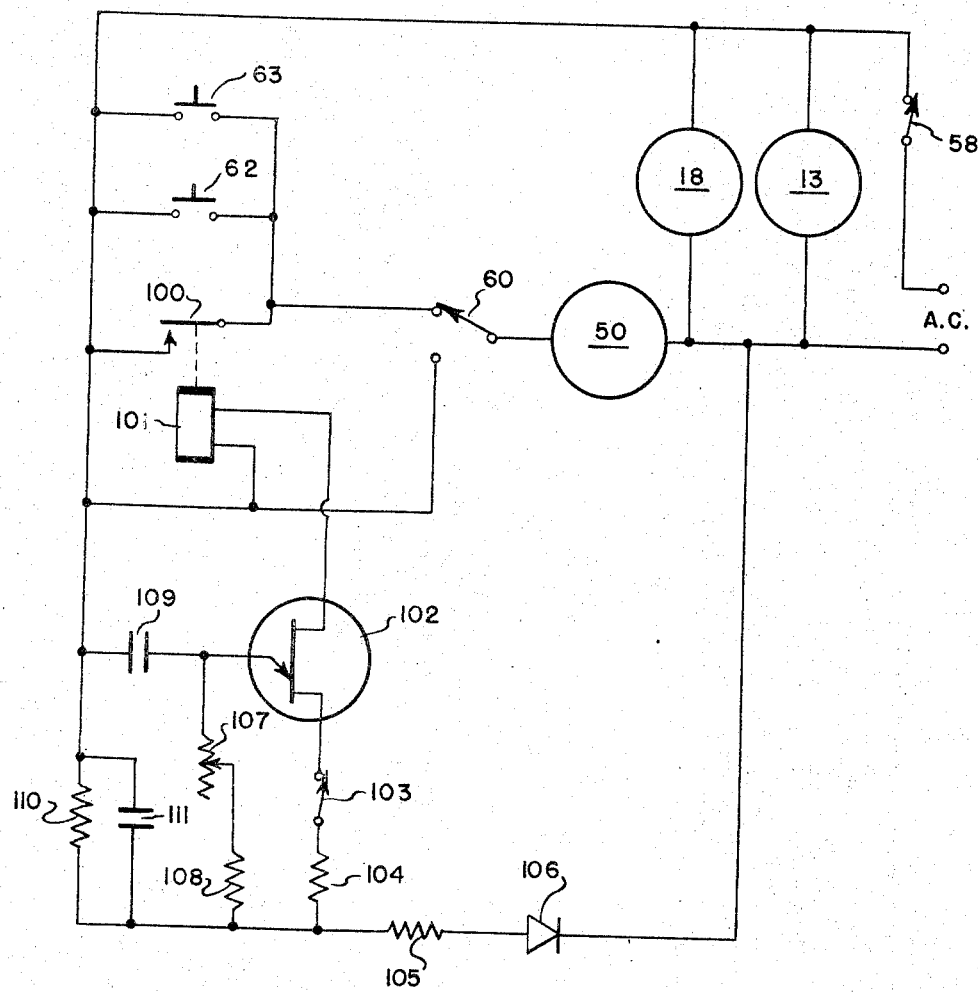
FIG. 10 is a circuit schematic of an electrical control system for the slide projecting device.

By referring to FIG. 10 the automatic mode of operation may be better understood. One side of a 115 volt A.C. line is connected to the incandescent bulb 13, the motor driven fan 18, and the electric motor 50. The other side of the A.C. line is connected to the on-off switch 58. When the switch 58 is closed it energizes the bulb 13 and fan 18 and connects the A.C. line to the push-button switch 62 and the remote control push-button switch 63. When either of these push-buttons is depressed the A.C. voltage is supplied through the contacts of the micro switch 60 to the motor 50. The micro switch 60 is shown in FIG. 10 in the position it occupies at the end of each cycle of changer operation. When the energization of the motor 50 begins a new cycle the micro switch 60 switches to the position opposite that shown in FIG. 10, placing the A.C. voltage across the motor 50 even after the push-button switch 62 or 63 is released. The motor 50 remains energized for one complete cycle of operation until the micro switch 60 is again actuated removing the A.C. voltage from across the motor 50.

When the changer mechanism is in the automatic mode of operation the contacts 100 of an electromagnetic relay 101 serve to duplicate repeatedly the operation of the push-buttons, but at an adjustable repetition rate. One terminal of the coil of the relay 101 is connected to one side of the A.C. line. The other terminal of the coil of relay 101 is connected to one of the two base terminals of a unijunction type transistor 102. The other base terminal of the unijunction transistor 102 is connected through the contacts of a switch 103, a resistor 104, a resistor 105 and a rectifier 106 to the second side of the A.C. line. The emitter of the unijunction transistor 102 is connected through a variable resistor 107 and a resistor 108 to the resistor 105, and also through a capacitor 109 and a paralleled resistor 110 and capacitor 111 to the resistor 105.

To place the changer in the automatic mode of operation the switch 103 is closed. An electrical signal builds up at the emitter of the unijunction transistor 102, at a rate determined by the setting of the variable resistor 107 (controlled by the shaft 61) until the transistor 102 is caused to fire, or conduct, and a signal appears at its collector of sufficient magnitude to energize the relay 101, thereby causing its contacts 100 to produce the same result as if one of the push-buttons 62 or 63 had been depressed. When the transistor 102 conducts to energize the relay 101 the signal at its emitter is discharged, and the circuit is put in condition for the next build up of signal at the emitter of the transistor 102, again at a rate determined by the setting of the variable resistor 107.

Suitable values for the circuit elements using a 2N2160 type unijunction transistor 102 are as follows: resistor 104—330 ohm; resistor 105—7,500 ohm; resistor 107—10,000 ohm; resistor 108—6,800 ohm; resistor 110—150,000 ohm; capacitor 109—100 μfd.; capacitor 111—50 μfd. The switch 103 may be mounted on the variable resistor 107 so that rotation of the one shaft 61 controls both elements.

In FIGS. 11 to 16, overload control means is illustrated which prevents damage to the slide-changing mechanism in the event it is jammed. Consider, for example, what would happen if in the FIG. 2 stage of operation of the device a slide-holder 35 were already located in what should be the open slot in the magazine into which the slide-holder 35' is to be displaced by the slide-changing mechanism. The slide-holder 35' in the carriage 72 would jam against the slide-holder already in the slot opposed to the carriage and the motor 50 could no longer rotate. The device shown in FIGS. 11 to 16 is designed to prevent overloading of the motor under these conditions and allow it to operate freely even though the slide-changing mechanism 12 may be jammed.

This is done by replacing the crank 55 described in the embodiment of FIGS. 1 to 10 with a new crank 55' which in effect can shorten in length under overload conditions. (All parts appearing in FIGS. 11 to 16 which are the same as those in FIGS. 1 to 10 are given the same reference numerals.) As before, the motor 50 drives a belt 51 which in turn rotates a pulley 52 to turn a gear 53 to which the crank 55' is eccentrically mounted. The crank arm 55 is pivotally connected to the gear 53 by means of a pin 120. The crank 55' serves to oscillate the rocker arm 65 which is pivotally connected to the indexing arm 66 and pusher arm 67 as described previously. A pin 121 on the rocker arm 65 provides pivotal attachment means for the crank.

The crank is a composite assembly of several parts, the basis of which is an arm 123 formed with a hole at one end to fit over the pin 120 on the gear 53 and a slot 124 at its other end. The arm 123 is also formed at its end adjacent the slot 124 with downwardly turned flanges 126 describing a track, as shown most clearly in FIG. 16. Longitudinally slidable in the track defined by the flanges 126 is a slide 127 supporting an upwardly projecting post 128 which extends through the slot 124 in the arm 123. A journal sleeve 129 is disposed about the post 128 to provide it with a rotatable bearing surface. At one end of the slide 127 remote from the post 128 there is formed a hole which receives the pin 121 on the rocker arm 65. A locking bar 131 is pivotally attached by a pin 132 to the upper surface of the arm 123. At its end remote from the pin 132, the locking bar is formed with a hook 134 in which a semi-circular seat 135 is defined. A wire spring 137 is wrapped around the pin 132 with its opposite ends clasped to the locking bar 131 and the arm 123 respectively to urge them together in scissors fashion so that the locking arm 131 overlies the arm 123 as shown in FIG. 11.

It is the purpose of this overload control means in the drive means of the slide changing mechanism to permit continued operation of the drive means without reciprocating the carriage and the indexing means. Under conditions of normal load, the crank 55' is in the state shown in FIGS. 11 and 14. The spring 137 urges the locking bar 131 into alignment with the arm 123 so that the hook 134 fits around the journalled post 128 on the slide 127. Since the journalled post 128 is disposed within the seat 135, it cannot move along the axis of the crank in the slot 124 and the entire crank assembly is held together as a rigid unit. Thus, the gear 53 can transmit oscillation to the rocker arm 65 through the crank 55 precisely in the manner of the previous embodiment. However, the slide changing mechanism could become jammed under certain circumstances, as when a slide holder is left within the slot in the magazine into which the carriage attempts to displace another slide holder. Under these circumstances, the rocker arm 65 cannot carry out its full stroke to the left as shown in FIGS. 11 to 13 and the crank 55' is immediately put under compression. This overload would cause the motor 50 to stall if it were not for the control means provided by the crank 55'.

When the rocker arm 65 can move no further to the left because of jamming, the journalled post 128 pushes forcibly against the side of its somewhat semi-circular seat 135 and forces the locking bar 131 to one side against the bias of the spring 137. As soon as the journalled post 128 is out of the seat 135, it can move in the slot 124 as shown in FIG. 12 and effectively shorten the length of the crank 55. This permits the gear 53 to continue its revolution as shown in FIG. 13 without stalling the motor 50 even though the rocker arm 65 may not move to the left beyond the position shown in FIG. 12. As the gear 53 passes dead center and puts the crank 55' under tension, the journalled post 128 returns in its slot to its starting position and the spring 137 swings the locking bar 131 back to its initial position over the arm 123 with the hook 134 disposed about the journalled post 128. If on the next half cycle of the gear 53 the mechanism is still jammed, the crank 55 will shorten in length once more. As soon as the jamming is removed, however, it will hold its full length as shown in FIGS. 11 and 14 and operate the slide changing mechanism in normal fashion.

I claim:

1. In a film slide projector wherein slide holders are stored in respective slots in a rotatable magazine, a slide changing mechanism for displacing successive holders between the magazine and optical projecting means including a frame, and a carriage on the frame biased toward the magazine and reciprocable in a path extending past the projecting means toward the magazine, the improvement in combination therewith comprising:

(a) a reciprocable indexing arm on the frame for rotating the magazine to index successive slots into alignment with the carriage path, (b) carriage reciprocating means pivotally secured to the indexing arm, (c) lost motion connection means joining the carriage reciprocating means to the carriage to permit the indexing arm to rotate the magazine after the carriage is stopped at a point nearest the magazine, (d) coupling means on the carriage to be engaged and disengaged by successive holders when the magazine is indexed and which is disposed to locate an engaged holder operatively within the projecting means when the carriage is remote from the magazine, and (e) drive means for reciprocating the indexing arm and carriage reciprocating means.

2. A film slide projector according to claim 1 wherein the coupling means comprises a hook extending from one corner of each holder on that side thereof remote from the center of the magazine when the holder is within its slot, and a mating hook-like coupler on that end of the carriage adjacent the magazine.

3. A film slide projector according to claim 1 wherein a circular array of spaced posts depends from the bottom of the magazine for successive engagement with the indexing means.

4. A film slide projector according to claim 1 wherein detent means locates the magazine in one of a number of discrete indexed positions corresponding to the number of slots in the magazine.

5. A film slide projector according to claim 1 wherein each slide holder circumscribes its respective slide and has one edge defined by oppositely biased spring strips, one of said strips adapted to bear resiliently against the slide and the other against the magazine so that the slide is held releasably in the holder and the holder is held releasably in the magazine.

6. A film slide projector according to claim 1 wherein means are provided for selectively rendering inoperative the coupling means by which the holders are attached to the carriage.

7. A film slide projector according to claim 1 which includes electrical timing means for automatically operating the drive means after variable periods of controlled duration.

8. A film slide projector according to claim 1 wherein the lost-motion connecting means comprises a slide assembly pivotally attached to the pusher arm and moveable along a slot in the carriage aligned with the carriage path.

9. In a film slide projector according to claim 1 further comprising overload control means in the drive means permitting continued operation of the drive means without reciprocating the indexing arm and carriage reciprocating means.

10. A film slide projector according to claim 9 wherein said overload control means includes a crank arm of given length comprising spring-biased length-changing means for shortening the crank arm length under overload conditions and returning the crank arm to said given length when the overload is removed.

11. A film slide projector according to claim 10 which includes automatically releasable locking means positively restraining said length-changing means against operation except under overload conditions.

12. In a film slide projector wherein slide holders are stored vertically in respective slots radially disposed in a circular magazine rotatable about a vertical axis, a slide-changing mechanism for displacing successive holders horizontally between the magazine and optical projecting means comprising:

(a) a frame, (b) a slidable carriage on the frame reciprocable in a horizontal path extending past the projecting means toward the axis of the magazine, (c) a pusher arm joined to the carriage and moveable therewith, (d) lost-motion connecting means joining the pusher arm to the carriage to permit the pusher arm to continue movement toward the magazine after the carriage approaches nearest the magazine, (e) a reciprocable indexing arm for engaging the periphery of and rotating the magazine to index the successive slots into alignment with the carriage path after the carriage approaches nearest the magazine, (f) coupling means on the carriage and each holder from which one holder is detached and another attached as the magazine is indexed and which is disposed to locate an attached holder operatively within the projecting means when the carriage is remote from the magazine, and (g) a driven rocker arm pivotally connected to the pusher arm and the indexing arm for reciprocating the pusher arm and the indexing arm toward and away from the magazine.

13. For use in a film slide projector magazine, a slide holder comprising a flanged element in which the associated slide is seated, and oppositely biased spring strips defining one edge of the flanged element, one of said strips being adapted to bear resiliently against the slide and the other against the magazine so that the slide is held releasably in the holder and the holder is held releasably in the magazine.

References Cited
UNITED STATES PATENTS

| | | | |
|---|---|---|---|
| 1,481,201 | 1/1924 | Headding et al. | 88—27 |
| 2,843,951 | 7/1958 | Richards | 88—27 |
| 2,942,365 | 6/1960 | Badalich | 88—28 |
| 3,204,522 | 9/1965 | Wadsworth | 88—27 |

NORTON ANSHER, *Primary Examiner.*

R. M. SHEER, *Assistant Examiner.*